United States Patent
Hsu et al.

(10) Patent No.: US 9,772,618 B2
(45) Date of Patent: Sep. 26, 2017

(54) CUTTING TOOL CONTROLLER AND METHOD OF CONTROLLING THE SAME

(71) Applicant: Industrial Technology Research Institute, Chutung, Hsinchu County (TW)

(72) Inventors: Che-Wei Hsu, Chutung (TW); Chien-Yi Lee, Chutung (TW); Yi-Ying Lin, Chutung (TW); Shih-Je Shiu, Chutung (TW); Yung-Ming Kao, Chutung (TW)

(73) Assignee: Industrial Technology Research Institute, Chutung, Hsinchu County (TW)

( * ) Notice: Subject to any disclaimer, the term of this patent is extended or adjusted under 35 U.S.C. 154(b) by 485 days.

(21) Appl. No.: 14/584,007

(22) Filed: Dec. 29, 2014

(65) Prior Publication Data

US 2016/0132039 A1 May 12, 2016

(30) Foreign Application Priority Data

Nov. 6, 2014 (TW) .............................. 103138492 A

(51) Int. Cl.
*G05B 19/19* (2006.01)
*G05B 19/404* (2006.01)
(Continued)

(52) U.S. Cl.
CPC .............. *G05B 19/19* (2013.01); *B23Q 1/522* (2013.01); *B23Q 17/2457* (2013.01); *B27C 5/02* (2013.01);
(Continued)

(58) Field of Classification Search
CPC ...... B23Q 17/2457; B23Q 1/522; B27C 5/02; G05B 19/404; G05B 2219/49184; G05B 19/19; G05B 2219/37582
(Continued)

(56) References Cited

U.S. PATENT DOCUMENTS

| 4,723,219 A | * | 2/1988 | Beyer | ................ G05B 19/4067 318/572 |
| 2009/0140684 A1 | * | 6/2009 | Otsuki | ................ G05B 19/404 318/572 |
| 2011/0188959 A1 | | 8/2011 | Brambs et al. | |

FOREIGN PATENT DOCUMENTS

| CN | 101859126 A | 10/2010 |
| CN | 102350522 A | 2/2012 |

(Continued)

OTHER PUBLICATIONS

CN 101859126 English Abstract.
(Continued)

*Primary Examiner* — Michael J Brown
(74) *Attorney, Agent, or Firm* — McCarter & English, LLP; Yu Lu

(57) ABSTRACT

A cutting tool controller and method of controlling are provided. The method includes providing a swing angle for the cutting tool, obtaining a swing vector of the cutting tool through kinematics calculation according to the swing angle, using the swing vector of the cutting tool to calculate a set of possible solutions of a swaying angle of the cutting tool, selecting a possible solution satisfying an operation condition of the machine from the set of possible solutions, using the selected possible solution to calculate an offset of positions of the cutting tool before and after swaying, so as to generate a compensation vector, calculating required compensation values for three axes of the machine according to the compensation vector, and outputting a control
(Continued)

command including the compensation values, such that the cutting tool of the machine or a working table for placing the workpiece thereon of the machine moves correspondingly.

11 Claims, 4 Drawing Sheets

(51) Int. Cl.
  *B27C 5/02* (2006.01)
  *B23Q 1/52* (2006.01)
  *B23Q 17/24* (2006.01)
(52) U.S. Cl.
  CPC .. *G05B 19/404* (2013.01); *G05B 2219/37582* (2013.01); *G05B 2219/45044* (2013.01); *G05B 2219/49184* (2013.01); *G05B 2219/50049* (2013.01)

(58) Field of Classification Search
  USPC .................... 700/159, 160, 175, 176, 178
  See application file for complete search history.

(56) References Cited

FOREIGN PATENT DOCUMENTS

| | | |
|---|---|---|
| CN | 103862326 A | 6/2014 |
| CN | 103926873 A | 7/2014 |
| TW | 499345 B | 8/2002 |

OTHER PUBLICATIONS

CN 102350522 English Abstract.
CN 103862326 English Abstract.
CN 103926873 English Abstract.
TW 499345 English Abstract.
Office Action issued Jun. 3, 2016 in TW 10520697470.

* cited by examiner

CUTTING TOOL CONTROLLER AND METHOD OF CONTROLLING THE SAME

CROSS-REFERENCE TO RELATED APPLICATIONS

This application claims foreign priority under 35 U.S.C. §119(a) to Patent Application No. 103138492, filed on Nov. 6, 2014, in the Intellectual Property Office of Ministry of Economic Affairs, Republic of China (Taiwan, R.O.C.), the entire content of which Patent Application is incorporated herein by reference.

BACKGROUND OF THE INVENTION

1. Technical Field

The present disclosure is directed to control techniques of machines, and, more particularly, to a cutting tool controller and a method of controlling the same.

2. Description of Related Art

In the application of machining, most machining paths employ sphere blades to perform cutting. However, the sphere blade generates machining static points on paths in tri-axes, which not only wears the cutting tool but also roughs the machining surface. Also, the luster of the machining surface is not ideal, resulting in prolonged machining time or bad quality.

As shown in FIG. 1, after a machining path plan is accomplished, a cutting tool principle axis 1, which is controlled by a machine, performs cutting, the cutting tools of the machine are usually sphere blades, wherein the cutting tool principle axis 1 moves according to a cutting tool principle axis path 10, such that cutting tool 11 performs cutting along a machining cutting tool path 3. Since a cutting tool tip 111 of the cutting tool 11 is perpendicular to a workpiece surface, a machining static point 31 is generated. Since the cutting tool 11 is perpendicular to the workpiece surface, the center of a blade axis of the cutting tool 11 being immovable, such that the cutting tool 11 cannot perform cutting. This results in unevenness of the machining surface. If the unevenness is serious, the machining path has to be adjusted to cut the workpiece again, so as to obtain a desired cutting result. However, it is extremely complicated to adjust the machining path. Specifically, since the machine and the CAD/CAM software for programming the machining path are separate, parameters of the CAD/CAM software have to be inputted to the machine to be converted into NC codes executable on the machine after the CAD/CAM software complete programming the machining path. As such, when a new machining path is required, transcoding has to be performed again to generate new NC codes. The whole process is complicated. Moreover, if the machine and an equipment executing the CAD/CAM software are independent, data transmission and file conversion processes that have to be performed will take even more time.

From the foregoing, persons skilled in the art need a new control technique of the machine. It is desired to find and exclude the generation of machining static points without modifying the original machine equipment, so as to provide a machining control mechanism that reduces machining time. Also, if the wearing of cutting tool can be simultaneously reduced and the smoothness and luster of the workpiece surface can be enhanced, this will bring a great improvement to the quality of the workpiece. This has become a technical issue desired to be solved by persons skilled in the art.

SUMMARY OF THE INVENTION

The present disclosure provides a method of controlling a cutting tool, which controls a position relation between the cutting tool of a machine and a workpiece, comprising: providing a swing angle for the cutting tool; obtaining a swing vector of the cutting tool through kinematics calculation according to the swing angle; using the swing vector of the cutting tool to calculate a set of possible solutions of a swaying angle of the cutting tool; selecting a possible solution satisfying an operation condition of the machine from the set of possible solutions; using the selected possible solution to calculate an offset of positions of the cutting tool before and after swaying, so as to generate a compensation vector; calculating required compensation values for three axes of the machine according to the compensation vector; and outputting a control command including the compensation values, such that the cutting tool of the machine or a working table for placing the workpiece thereon of the machine moves correspondingly.

The present disclosure further provides a cutting tool controller performing the method of controlling the cutting tool.

The present disclosure further provides a cutting tool controller, providing an adjustment of a position relation between a cutting tool of a machine and a workpiece, the cutting tool controller comprising: a compiling unit compiling machining parameters of a cutting path to be performed, so as to generate a swing angle; a kinematics calculation unit calculating a swing vector of the cutting tool according to the swing angle; a compensation unit calculating an offset of positions of the cutting tool before and after swaying, so as to generate a compensation vector; and a dynamic control unit calculating required compensation values for three axes of the machine according to the compensation vector, so as to generate a corresponding control command corresponding to the compensation values.

DETAILED DESCRIPTION OF THE INVENTION

Figure 1:
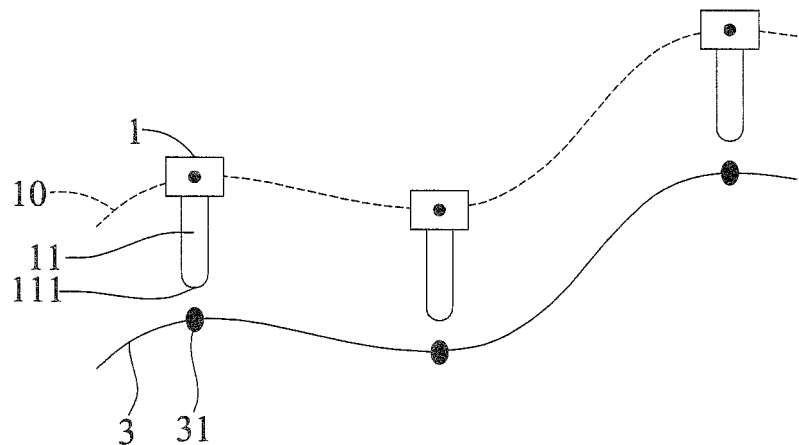
FIG. 1 is a schematic view of a cutting method of a traditional machine.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
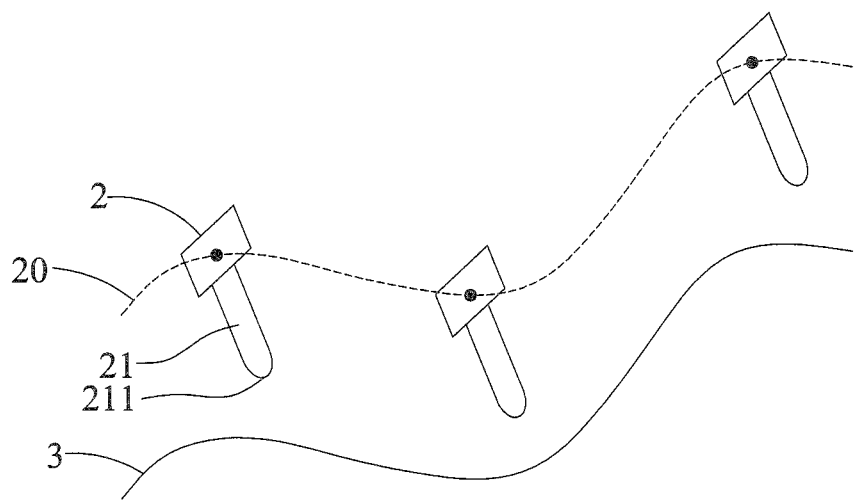
FIG. 2 is a schematic view of a cutting method according to the present disclosure.

FIG. 2 is a schematic view of a cutting method according to the present disclosure. As shown in FIG. 2, a machine controls a cutting tool principle axis 2 to perform a cutting process. During fine machining, a cutting tool is usually a sphere blade, such that if a cutting tool 21 is maintained vertical to a workpiece surface, static points as shown in FIG. 1 will be generated. Therefore, the present disclosure proposes a method to change a swaying angle of the cutting tool 21 while keeping a machining cutting tool path 3 unchanged. As such, it is necessary to move the relative position relation between the cutting tool 21 and the workpiece, such that an identical cutting result under the original machining condition can be achieved when the machine controls the cutting tool principle axis 2 to perform cutting.

Figure 3:
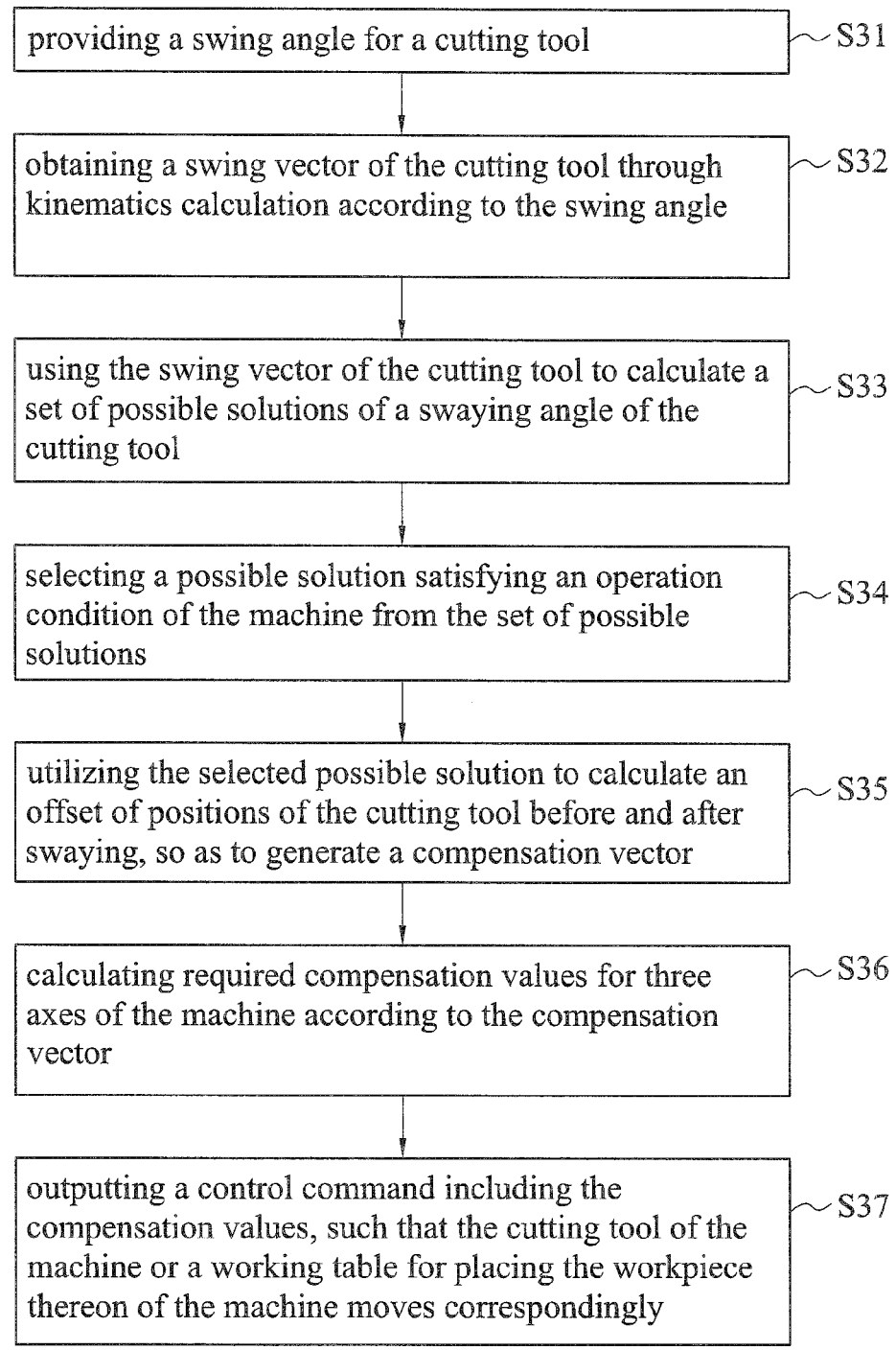
FIG. 3 is a flow chart illustrating a method of controlling a cutting tool according to the present disclosure.

FIG. 3 is a flow chart illustrating a method of controlling a cutting tool according to the present disclosure. In an embodiment, a method of controlling the cutting tool provides machining control of the position relation between the cutting tool of the machine and the position relation of the workpiece. Specifically, in an embodiment, the machine can be a machine stage including three linear axes and two rotational axes, and uses a five-axial controller and a control of a shift of a cutting point to eliminate the generation of the static points on the original path by changing the original cutting tool. Accordingly, the workpiece surface can be smoother, and the machining time can be significantly reduced by changing a swaying angle of the cutting tool directly through the controller. This cannot be achieved by a controller of the conventional machine.

In step S31, a swing angle of the cutting tool is provided. Specifically, the swing angle refers to an angle between an original vertical plane of the cutting tool before swaying and a plane of the cutting tool after swaying. The swing angle can be adjustably inputted upon the need since different machines or workpiece have different adopting conditions. For example, a five-degree cutting obtains a smooth result, a 10-degree cutting obtains a smoother result, and a 45-degree cutting obtains an optimally smooth result, however some machines or workpieces may not be adoptable to the 45-degree cutting performed by the cutting tool. Thus, this step can input the swing angle of the cutting tool according to adoptable conditions of the machines or workpieces.

In step S32, a swing vector of the cutting tool is obtained through kinematics calculation according to the swing angle. With a known swing angle, the swing vector of the cutting tool can be obtained through kinematics analysis calculation. Specifically, the swing vector can be obtained by using a relation between a rotation point and an arm of force.

In step S33, the swing vector of the cutting tool is used to calculate a set of possible solutions of a swaying angle of the cutting tool, wherein the swaying angle includes a tilting angle and a rotational axis angle of the cutting tool of the machine. Specifically, with different angle arrangement, the cutting tool can still achieve the same cutting result. For example, the cutting tool and the workpiece have an angle relation of 45 degrees, if the cutting tool rotates 180 degrees along a Z axis, the angle relation between the cutting tool and the workpiece is still 45 degrees, but the cutting direction may be exactly opposite. Thus, if the cutting tool performs cutting to the right before rotating, the cutting tool has to perform cutting to the left after rotating.

From the foregoing, the set of possible solutions indicate that the cutting tool uses a positive or negative swaying angle with respect to the original vertical plane to achieve an identical cutting objective. As such, in one swing angle of the cutting tool, two possible solutions (possible methods to perform cutting) may be generated, and thus step S33 uses the swing vector of the cutting tool to calculate a set of possible solutions for subsequently calculating a swaying compensation.

In step S34, a possible solution satisfying an operation condition of the machine is selected from the set of possible solutions. As mentioned above, different machines have different operation mechanisms, and thus have different constraints. For example, some machines cannot provide a cutting with an angle greater than 30 degrees. Therefore, in step S34, one satisfying the operation condition is found from the set of possible solutions according to the operation condition, where there may be only one satisfying the operation condition, and if there are two solutions satisfying the operation condition, either one is applicable.

In step S35, the selected possible solution is utilized to calculate an offset of positions of the cutting tool before and after swaying, so as to generate a compensation vector. This step shows that when a cutting method is selected, the cutting tool will sway from the original position, and thus the cutting point of the cutting tool after swaying is different from the original cutting point. This is because the cutting tool has been swayed to a certain angle from the original position. Therefore, step S35 calculates an offset of positions of the cutting tool between the cutting tool after swaying and the cutting tool with an original vertical plane, such that a compensation vector is obtained according to a distance relation. Then, the compensation vector is utilized to control a position relation between the cutting tool and the workpiece.

In step S36, required compensation values for three axes of the machine are calculated according to the compensation vector. In step S35, the offset between the cutting tool and the workpiece and the compensation vector to maintain and control the cutting tool and workpiece in the original position relation have been calculated. In step S36, the compensation vector is utilized to calculate the required compensation values for three axes of the machine. That is, the compensation relation between the cutting tool and workpiece is substantially converted into the movement values for three axes for controlling the machine.

In step S37, a control command including the compensation values is outputted, such that the cutting tool of the machine or a working table for placing the workpiece thereon of the machine moves correspondingly. As the movement values for three axes of the machine are known, the control command including the compensation values can be outputted, so as to control the movement of the cutting tool or the working table. Since each machine has a different type, especially some working tables are immovable, the position relation of the cutting tool or the working table can be adjusted according to the constraint of the machine. Therefore, the objective of step S37 is to allow the cutting tool to perform cutting with the original cutting path by moving the relative position between the cutting tool and the workpiece.

According to the method according to the present disclosure, a controller is used to change the relation between the cutting tool and the workpiece surface through changing the swing angle of the cutting tool, so as to facilitate eliminating the generation of machining static points. However, since the angle of the cutting tool is changed, it is needed to maintain the cutting tool and workpiece at the original relative position. As such, the present disclosure calculates the position compensation and moves the cutting tool and the working table, so as to maintain the relative relation between the cutting tool and the workpiece in the original machining path while achieving an identical cutting result without machining static points, thereby increasing the smoothness and luster of the workpiece surface.

Furthermore, with directly controlling the swaying angle of the cutting tool, it is unnecessary to employ the processes of using conventional CAD/CAM to re-modify the machining path and converting data, and thus the machining time can be reduced.

It should be appreciated that the method of controlling the cutting tool can be employed in machine of various machine body constructions, for example, the configuration can be a 3+2 axes configuration configuration, a 4+1 axes configuration configuration or a dual-axes configuration configuration, which will be specified in the following descriptions.

Figure 4:
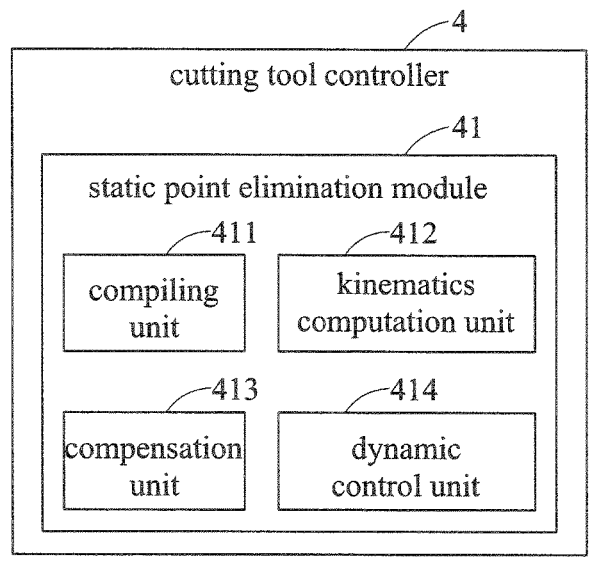
FIG. 4 is a structural view of a cutting tool controller according to the present disclosure.

FIG. 4 is a structural view of a cutting tool controller according to the present disclosure. As shown in FIG. 4, a cutting tool controller 4 according to an embodiment is the controller carrying out aforementioned method of controlling the cutting tool. The controller 4 includes a static point eliminating module 41 for adjusting the position relation between the cutting tool and the workpiece, the static point eliminating module 41 comprising: a compiling unit 411, a kinematics computation unit 412, a compensation unit 413 and a dynamic control unit 414.

The compiling unit 411 is for decoding machining parameters of the cutting path to be performed, so as to generate the swing angle. The compiling unit 411 corresponds to the execution of step S31. Specifically, after the cutting path to be performed is determined, corresponding machining parameters are inputted to the cutting tool controller 4. The compiling unit 411 decodes the machining parameters, such that the machining parameters can be executed by the cutting tool controller 4, where the machining parameters comprising the swing angle of the cutting tool.

The kinematics computation unit 412 is for calculating the swing vector of the cutting tool according to the swing angle. The kinematics computation unit 412 corresponds to the execution of step S32. Therefore, the kinematics computation unit 412 obtains the swing vector of the cutting tool through the kinematics calculation after receiving the machining parameters including the swing angle of the cutting tool.

The compensation unit 413 is for calculating the offset of the positions of the cutting tool before and after swaying to generate the compensation vector. The compensation unit corresponds to the executions of steps S33-S35. In other words, the compensation unit 413 mainly computes how much compensation should be provided after the cutting tool swaying, such computation should be performed with the use of kinematics.

The dynamic control unit 414 calculates the compensation values required by the three axes of the machine according to the compensation vector, and generates corresponding control commands through the compensation values. The dynamic control unit 414 corresponds to the executions of steps S36 and S37. Specifically, the dynamic control unit 414 is provided to generate the corresponding control commands after obtaining the compensation values of the workpiece or the cutting tool, such that the cutting tool controller 4 performs a corresponding swaying compensation.

In addition, the cutting tool controller 4 of an embodiment further comprises an input module (not shown) for the provision of inputting the machining parameters and controller parameters, which can usually be presented with a human-machine interface. The machining parameters are relative definitions of aforementioned cutting path to be performed, and the controller parameters are basic settings during the operation of the controller such as position settings of each rotation axis and workpiece.

The cutting tool controller 4 of an embodiment further comprises an output module (not shown) for transmitting the control commands to a driver of the machine, so as to control the movement of the cutting tool or the working table. As mentioned above, after the compensation values are obtained, the dynamic control unit 414 generates the control commands, and the control commands are transmitted to the driver of the machine for execution through the output module.

Figure 5A:
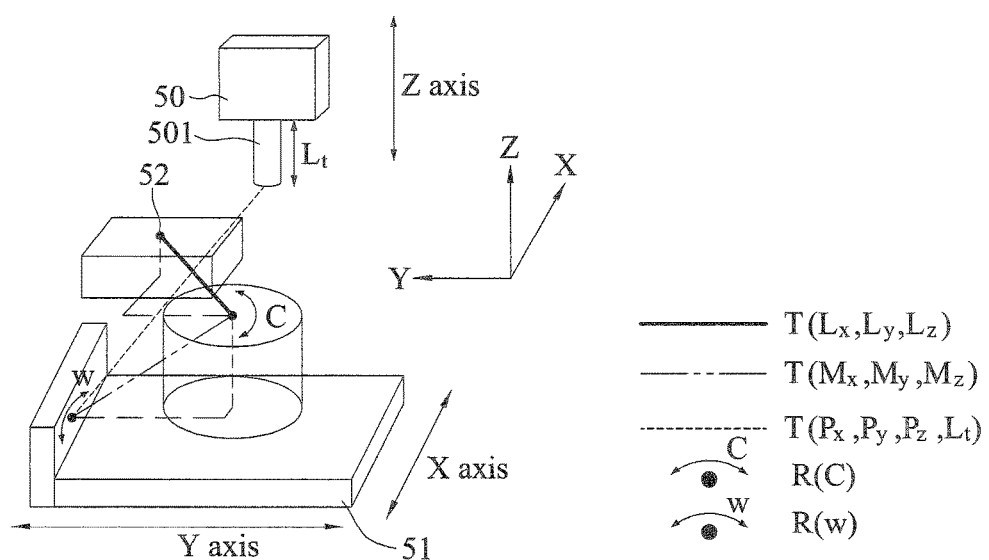
FIG. 5A is a schematic view of a 3+2 axes configuration using the method of controlling the cutting tool according to the present disclosure.
Figure 5B:
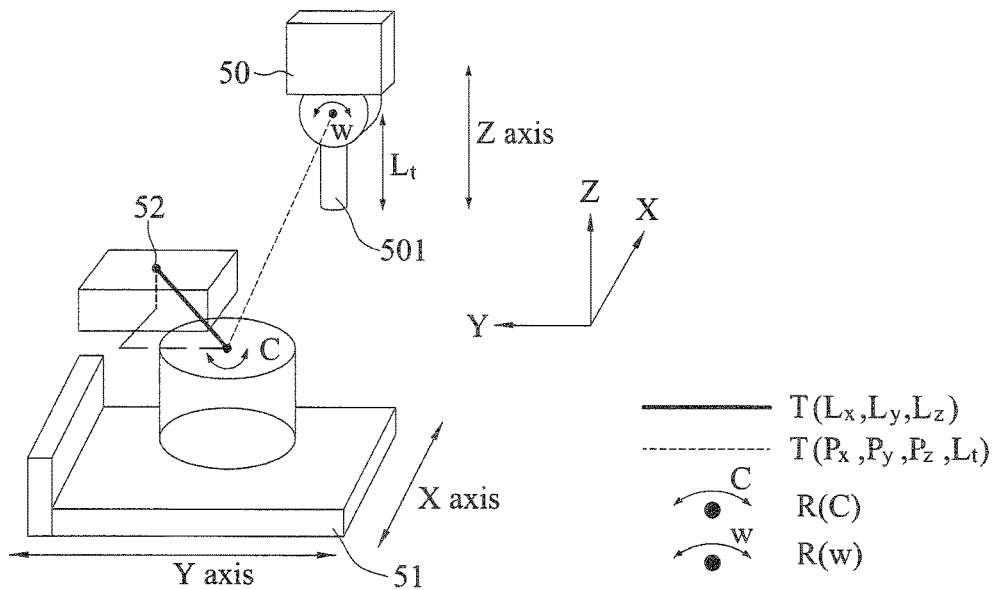
FIG. 5B is a schematic view of a 4+1 axes configuration using the method of controlling the cutting tool according to the present disclosure.
Figure 5C:
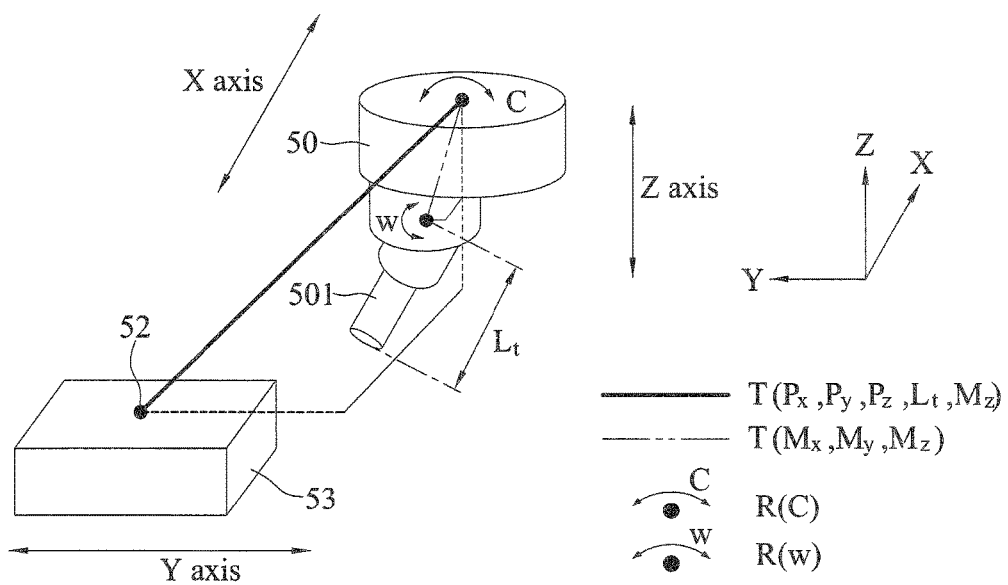
FIG. 5C is a schematic view of a dual-axes configuration using the method of controlling the cutting tool according to the present disclosure.

Subsequently, according to a specific embodiment, the swaying compensation calculation of various machine configurations such as 3+2 axes configuration, 4+1 axes configuration or dual-axes configuration is described. FIG. 5A is a schematic view of a 3+2 axes configuration using the control method of the cutting tool according to the present disclosure, FIG. 5B is a schematic view of a 4+1 axes configuration using the control method of the cutting tool according to the present disclosure and FIG. 5C is a schematic view of a dual-axes configuration using the control method of the cutting tool according to the present disclosure.

As shown in FIG. 5A, a cutting tool 501 is controlled by a principle axis 50, and a vector model of the cutting tool $$\vec{K}=T(L_x,L_y,L_z)\cdot R(C)\cdot T(M_x,M_y,M_z)\cdot R(w)\cdot T(P_x,P_y,P_z,L_t)\cdot \vec{T}_V$$

and a position model of the cutting tool $$\vec{Q}=T(L_x,L_y,L_z)\cdot R(C)\cdot T(M_x,M_y,M_z)\cdot R(w)\cdot T(P_x,P_y,P_z,L_t)\cdot \vec{T}_O$$

can be obtained after providing a swing angle to the cutting tool 501, where $T(L_x,L_y,L_z)$ is an offset between a machining origin 52 and a rotation axis C, R(C) is a rotation axis matrix, R(w) is a shift axis matrix, $(P_x,P_y,P_z)$ is a tri-axes movement value, Lt is a length of the cutting tool, $\vec{T}_V$ and $\vec{T}_O$ are vectors of the cutting tool and position of the cutting tool, respectively. For example, the vector of the cutting tool in FIG. 5A is (0,0,1,0)T, and the initial value of the position of the cutting tool is (0,0,0,1)T.

As the $\vec{K}$, $\vec{Q}$, $T(L_x,L_y,L_z)$, $T(M_x,M_y,M_z)$, R(w), R(C) and Lt are known, the compensation vector $$\vec{P}=R^{-1}(w)\cdot T^{-1}(M_x,M_y,M_z)\cdot R^{-1}(C)\cdot T^{-1}(L_x,L_y,L_z)\cdot \vec{Q}+T(L_t)$$

can thus be obtained.

Corresponding to abovementioned method of controlling the cutting tool, the swing vector of the cutting tool obtained in step S34 of the method of controlling the cutting tool can correspond to the embodiment shown in FIG. 5A to find the $\vec{K}$ and $\vec{Q}$ above.

Step S33 of the method of controlling the cutting tool is to calculate a tilting angle and a rotation axis angle of the cutting tool of the machine to obtain a set of possible solutions of a swaying angle of the cutting tool, which corresponds to the embodiment shown in FIG. 5A as using the $\vec{K}$ and $\vec{Q}$ to calculate two sets of solutions and calculating the tilting angle and rotation axis angle of the two sets of solutions.

Step S34 of the method of controlling the cutting tool is to select a set of possible solutions, which corresponds to the embodiment shown in FIG. 5A as using a set of possible solutions to obtain the $R^{-1}(C)$ and $R^{-1}(w)$.

Step S35 of the method of controlling the cutting tool is to obtain the compensation vector, which corresponds to the embodiment shown in FIG. 5A as using the offset of the position of the cutting tool before and after the cutting tool sways to calculate and obtain the compensation vector $\vec{P}$.

Step S36 of the method of controlling the cutting tool is to calculate movement values for three axes, which correspond to the embodiment shown in FIG. 5A as using the compensation vector $\vec{P}$ to reversely calculate the compensation values required by the three axes of the machine.

From the foregoing, the compensation vector can be used to compensate the offset of the position of the cutting tool 501. For example, the position of the principle axis 50 of the cutting tool or the position of the working table 51 can be moved to maintain the machining path being identical with the original tri-axes path while changing the cutting point of the cutting tool at the workpiece.

FIG. 5B is a schematic view of a 4+1 axes configuration. Similarly, a cutting tool 501 is controlled by a principle axis 50, and a vector model of the cutting tool $\vec{K}=T(L_x,L_y,L_z)\cdot R(C)\cdot T(P_x,P_y,P_z,L_t)\cdot R(w)\cdot T(L_t)\cdot \vec{T}_V$ and a position model of the cutting tool $\vec{Q}=T(L_x,L_y,L_z)\cdot R(C)\cdot T(P_x,P_y,P_z,L_t)\cdot R(w)\cdot T(L_t)\cdot \vec{T}_O$ can be obtained after providing a swing angle to the cutting tool 501, where $T(L_x,L_y,L_z)$ is an offset between a machining origin 52 and a rotation axis C, R(C) is a rotation axis matrix, R(w) is a shift axis matrix, $(P_x,P_y,P_z)$ is a tri-axes movement value, Lt is a length of the cutting tool (the distance from the tip of the cutting tool to the shift axis w), $\vec{T}_V$ and $\vec{T}_O$ are vectors of the cutting tool and position of the cutting tool, respectively. For example, the vector of the cutting tool in FIG. 5B is (0,0,1,0)T, and the initial value of the position of the cutting tool is (0,0,0,1)T.

As the $\vec{K}$, $\vec{Q}$, T(Lx,Ly,Lz), T(Px,Py,Pz,Lt), R(w), R(C) and Lt are known, the compensation vector $\vec{P}=R^{-1}(C)\cdot T^{-1}(L_x,L_y,L_z)\cdot\vec{Q}-\text{Matrix}(W,L_t)$ can thus be obtained.

As such, the compensation vector can be used to compensate the offset of the position of the cutting tool 501. For example, the position of the principle axis 50 of the cutting tool or the position of the working table 51 can be moved to maintain the machining path being identical with the original three-axes path while changing the cutting point of the cutting tool at the workpiece.

FIG. 5C is a schematic view of a dual-axes configuration. Similarly, a cutting tool 501 is controlled by a principle axis 50, and a vector model of the cutting tool $\vec{K}=T(P_x,P_y,P_z,L_t,M_z)\cdot R(C)\cdot T(M_x,M_y,M_z)\cdot R(w)\cdot \vec{T}_V$ and a position model of the cutting tool $\vec{Q}=T(P_x,P_y,P_z,L_t,M_z)\cdot R(C)\cdot T(M_x,M_y,M_z)\cdot R(w)\cdot T(L_t)\cdot \vec{T}_O$ can be obtained after providing a swing angle to the cutting tool 501, where T(Px, Py, Pz, Lt, Mz) is an offset between a machining origin 52 and a rotation axis C, R(C) is a rotation axis matrix, R(w) is a shift axis matrix, $(P_x,P_y,P_z)$ is a tri-axes movement value, Lt is a length of the cutting tool (the distance from the tip of the cutting tool to the shift axis w), $\vec{T}_V$ and $\vec{T}_O$ are vectors of the cutting tool and position of the cutting tool, respectively. For example, the vector of the cutting tool in FIG. 5B is (0,0,1,0)T, and the initial value of the position of the cutting tool is (0,0,0,1)T.

As the $\vec{K}$, $\vec{Q}$, T(Px,Py,Pz,Lt,Mz), T(Mx,My,Mz), R(w), R(C) and Lt are known, the compensation vector $\vec{P}=\vec{Q}-\text{Matrix}(M,W,C,\vec{T}_O,L_t)$ can thus be obtained. As such, the compensation vector can be used to compensate the offset of the position of the cutting tool 501. For example, the position of the principle axis 50 of the cutting tool or the position of the working table 51 can be moved to maintain the machining path being identical with the original tri-axes path while changing the cutting point of the cutting tool at the workpiece.

In summary, the cutting tool and the method of controlling the same according to the present disclosure perform a three-axes machining path through a five-axes machine and controller thereof. That is, adjusting the axis of the cutting tool which is perpendicular to the workpiece originally, so as to change the cutting point of the cutting tool at the workpiece. Then, a position compensation mechanism is employed, such that the cutting maintains at the position at the workpiece that is originally to be cut, which facilitates eliminating the generation of machining static points. From the foregoing, with controlling the cutting tool to sway and make position compensation according to the present disclosure, advantages such as shortening the machining time, reducing the wearing of the cutting tool to extend the life of the cutting tool, and increasing the smoothness and luster of the workpiece surface can be achieved.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A method of controlling a cutting tool, which controls a position relation between the cutting tool of a machine and a workpiece, comprising:
   providing a swing angle for the cutting tool;
   obtaining a swing vector of the cutting tool through kinematics calculation according to the swing angle;
   using the swing vector of the cutting tool to calculate a set of possible solutions of a swaying angle of the cutting tool;
   selecting a possible solution satisfying an operation condition of the machine from the set of possible solutions;
   using the selected possible solution to calculate an offset of positions of the cutting tool before and after swaying, so as to generate a compensation vector;
   calculating required compensation values for three axes of the machine according to the compensation vector; and
   outputting a control command including the compensation values, such that the cutting tool of the machine or a working table for placing the workpiece thereon of the machine moves correspondingly.

2. The method of claim 1, wherein the machine comprises three linear axes and two rotational axes.

3. The method of claim 1, wherein the swaying angle comprise a tilting angle and a rotational axis angle of the cutting tool of the machine.

4. The method of claim 1, wherein the swing angle is an angle between an original vertical plane of the cutting tool before swaying and a plane of the cutting tool after swaying.

5. The method of claim 4, wherein the set of possible solutions indicates that the cutting tool uses a positive or negative swaying angle with respect to the original vertical plane to achieve an identical cutting objective.

6. The method of claim 1, wherein a configuration of the machine comprises a 3+2 axes machine configuration, a 4+1 axes machine configuration, or a dual-axes machine configuration.

7. The method of claim 1, wherein the step of that the cutting tool of the machine or the working table for placing the workpiece thereon of the machine moves correspondingly refers to move a relative position between the cutting tool and the workpiece, such that the cutting tool performs cutting with an original cutting path.

8. A cutting tool controller performing the method of claim 1.

9. A cutting tool controller, providing an adjustment of a position relation between a cutting tool of a machine and a workpiece, the cutting tool controller comprising:
- a compiling unit compiling machining parameters of a cutting path to be performed, so as to generate a swing angle;
- a kinematics calculation unit calculating a swing vector of the cutting tool according to the swing angle;
- a compensation unit calculating an offset of positions of the cutting tool before and after swaying, so as to generate a compensation vector; and
- a dynamic control unit calculating required compensation values for three axes of the machine according to the compensation vector, so as to generate a corresponding control command corresponding to the compensation values.

10. The cutting tool controller of claim 9, further comprising an input module inputting the machining parameters and controller parameters.

11. The cutting tool controller of claim 9, further comprising an outputting module sending the control command to a driver of the machine to control the cutting tool or a working table to move.

* * * * *